United States Patent Office 3,578,646
Patented May 11, 1971

3,578,646
VINYL MONOMER POLYMERIZATION PROCESS
Charles W. Moberly and Gerald R. Kahle, Bartlesville, Okla., assignors to Phillips Petroleum Company
Continuation-in-part of application Ser. No. 778,709, Nov. 25, 1968. This application Oct. 29, 1969, Ser. No. 872,137
Int. Cl. C08f 1/04, 15/30, 45/00
U.S. Cl. 260—85.7
9 Claims

ABSTRACT OF THE DISCLOSURE

Pourability of polymers of vinyl monomers is improved by catalytic vapor phase polymerization of vinyl monomers in the absence of substantial amounts of solvent or diluent and in the presence of certain pourability modifiers, which may also improve the color of the product polymer. The pourability of polymers formed by liquid phase bulk polymerization of vinyl monomers can be improved by these modifiers.

---

Figure 1:
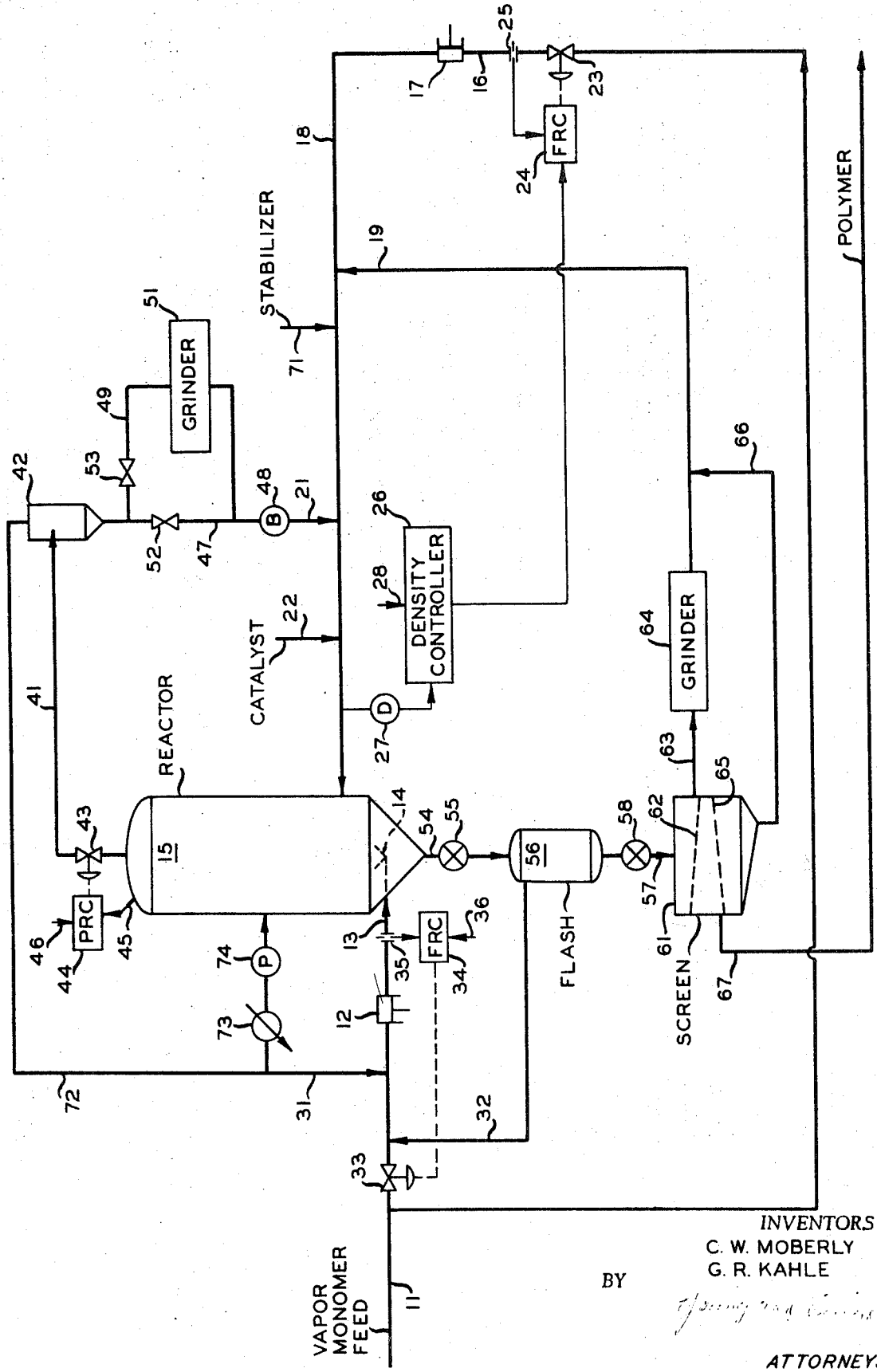

This application is a continuation-in-part of copending application Ser. No. 778,709, filed Nov. 25, 1968.

This invention relates to chemical processes and to the products of such processes. More particularly, the invention relates to novel polymers of vinyl monomers and to methods for producing said polymers. Specifically, the invention relates to novel polymers of vinyl compounds and to methods for the polymerization of vinyl monomers, alone or with suitable comonomers, in the substantial absence of solvents or diluents.

Vinyl polymers comprise highly marketable materials for the polymer molding and fabricating industry. The polymerization of vinyl monomers and their mixtures can be affected by bulk polymerization wherein the polymerization is conducted in the liquid phase in the absence of a substantial amount of solvent or diluent by merely adding an oil-soluble polymerization catalyst to the liquid vinyl compounds. A second technique is solution polymerization wherein a solvent is added to the mixture of catalyst and vinyl monomers. A third method for polymerizing vinyl monomers is emulsion polymerization, wherein a charge formed of liquid vinyl monomer, water-soluble polymerization catalyst, a water-soluble emulsifying agent and water are employed. Still another system is suspension polymerization wherein a charge comprising an oil phase consisting of an oil-soluble catalyst and liquid monomer dispersed in an aqueous phase consisting of water, suspending agents, wetting agents and coagulation agents is polymerized under conditions of vigorous agitation.

Recently it has been found that vinyl monomers can be commercially polymerized in the vapor phase. This technique involves the polymerization of vinyl compounds and mixtures thereof in the presence of a polymerization catalyst and in the absence of any substantial amount of solvent or diluent, under conditions of pressure and temperature such that the polymerization is effected in the vapor phase. A preferred embodiment effects the vinyl polymerization reaction in the presence of seed polymer particles.

A worthy modification of vapor phase polymerization utilizes a liquid phase agitated reactor and a gas-fluidized vapor reactor in series. Such a system overcomes many of the difficulties encountered in bulk polymerization of vinyl monomers, such as vinyl chloride in the liquid phase. In such a system it is often desirable to utilize the liquid phase reactor to produce seed polymer which acts as a solid support for any catalyst remaining from the first reactor and for additional catalyst introduced into the fluidized bed reactor. However, the utilization of two reactors increases the capital cost of the installation as well as greatly increasing the complexity of the operation.

Single-stage fluidized bed reactors permit the seed particles to be instantaneously admixed with the entire reaction mixture in the fluidized bed reactor. However, this results in a portion of the seed polymer particles being prematurely withdrawn as a portion of the reaction effluent. Not only does this reduce yield, but the presence of the small size seed particles gives a wider particle size range to the product than is desired. The fluidized bed also permits the growth of polymer particles which are larger than is desired. While these difficulties can be reduced by the use of a multiple-stage fluidized bed reactor, the particle size range can still be greater than desirable.

In pending application Ser. No. 778,709, filed Nov. 25, 1968, there is described a vapor phase polymerization process which overcomes many of the difficulties encountered in previously known vapor phase polymerization processes. In accordance with the described process, the reaction effluent from a fluidized bed reactor for the polymerization of vinyl-type monomer is screened to remove polymer particles having undesirable particle size. The particles which are too large are passed to a grinder to produce new seed polymer. Particles which are smaller than the desired minimum product particle size can be returned to the reactor directly or admixed with the new seed polymer particles for impregnation with catalyst. The catalyst impregnated seed particles are then returned to the reactor. The terms "impregnate," "impregnation," and the like as used herein, shall be understood to mean addition of catalyst to polymer particles by any means known to the industry, such as by spraying, dipping, and the like.

The base resin resulting from the vapor phase polymerization of vinyl monomers is a generally satisfactory material well suited for operations such as molding, pressing or extruding. However, these resins have an undesirable "wet" characteristic, i.e., the resins are not entirely free-flowing and tend to agglomerate, which introduces difficulty into their handling. This property, i.e., the ability of polymeric particles to flow freely with a minimum of agglomeration, is known as "pourability," and is to be distinguished from the property known as "lubricity" which has reference to the behavior of the molten polymer under processing conditions. Commercial plastics fabricators desire resinous materials which not only exhibit good flow and forming characteristics under processing conditions, i.e., in the molten state, but also flow freely in the dry state and do not plug transfer lines, hoppers and storage bins. Therefore, it is particularly advantageous to provide base resins having a high degree of pourability as well as good processing characteristics.

It has been found that the pourability of vinyl polymers produced by vapor phase catalytic polymerization of vinyl monomers is unexpectedly substantially improved when the polymerization is effected in accordance with this invention. Generally, the present invention contemplates preparing vinyl polymers by a process wherein vinyl chloride is polymerized, or copolymerized with other monomers, in the vapor phase, in the substantial absence of solvent or diluent, in the presence of a vinyl polymerization initiator and minor amounts of certain pourability modifiers, hereinafter described in greater detail, and the thus-formed polymer is recovered. It was further surprising to find that certain of these modifiers are effective in improving the color of the polymer product as well as its pourability.

The pourability modifiers which are employed in the practice of the invention comprise at least one compound selected from the class consisting of water; gelatin; phosphonates such as bis(β-chloroethyl - vinyl phosphonate; alkali metal salts of sulfosuccinic acid such as sodium salt of bis(2-ethylhexyl) sulfosuccinate; alkali metal salts of dialkyl sulfonimides such as sodium salts of di-$C_9$ to $C_{14}$-alkyl sulfonimides; salts of metals of Groups I–A, II–A, II–B and IV–A with saturated carboxylic acids having about 6 to 22 carbon atoms, preferably 7 to 18 carbon atoms; and mono-, di-, and trialkyltin salts of saturated carboxylic acids having about 2 to 20 carbon atoms, preferably 8 to 18 carbon atoms, wherein each alkyl group has 1 to about 12 carbon atoms, preferably 4 to 8 carbon atoms.

Examples of some suitable salts of metals of Groups I–A, II–A, II–B and IV–B with saturated carboxylic acids include lithium hexanoate, barium heptanoate, stannous 2-ethyloctanoate, beryllium decanoate, germanium laurate, sodium palmitate, calcium stearate, mercuric docosanoate, cadmium laurate, zinc stearate, potassium myristate, rubidium cyclopentanecarboxylate, magnesium cyclohexanecarboxylate, plumbic 3-methylcyclohexanecarboxylate, cesium 2 - methylcyclopentanecarboxylate, strontium 4 - ethylcyclohexanecarboxylate, and mixtures thereof, e.g., strontium naphthenates, barium-cadmium-zinc mixed soaps, and the like.

Examples of some suitable mono- di-, and trialkyltin salts of saturated carboxylic acids include trimethyltin acetate, diethyltin dipropionate, isopropyltin trivalerate, tributylin 2-methylheptanoate, dibutyltin dilaurate, trihexyltin palmitate, octyltin tristearate, didecyltin dimyristate, tridodecyltin eicosanoate, dipentyltin bis(cyclohexanecarboxylate), triheptyltin 3-methylcyclopentanecarboxylate, and the like and mixtures thereof. In addition to improving the pourability of the vinyl polymers produced by vapor phase polymerization, the alkyltin carboxylates have been found to provide unexpected improvement in color.

The polymers of vinyl chloride whose properties are improved by use of the process of this invention include poly(vinyl chloride) and copolymers of vinyl chloride and polymerizable monomers, e.g., vinyl esters such as vinyl acetate, vinyl butyrate, and vinyl stearate; vinyl ethers such as vinyl lauryl ether and vinyl cetyl ether; olefins such as ethylene and propoylene; and halogenated olefins such as vinylidene chloride, tetrafluorethylene, and perfluoropropylene. The vinyl chloride incorporated in the copolymers should comprise at least 75 percent by weight of the copolymer.

The polymerization initiators suitable for use in the practice of the invention can be any of the known catalysts for the polymerization of vinyl-type monomers. Preferred polymerization initiators are free radical precursors such as perhaloethanes, such as 1,1-dichloro-1,2,2,2-tetrabromoethane; organic peroxides such as dimethyl peroxide, dicyclohexyl peroxide, diphenyl peroxide, bis(α,α-diisopropyl-4-ethylbenzyl) peroxide, and acetylcyclohexane sulfonyl peroxide; dialkyl peroxydicarbonates such as diisopropyl peroxydicarbonate, di(2-ethylhexyl) peroxydicarbonate and di(3-butyl) peroxydicarbonate; azo compounds such as disclosed in U.S. Pat. 2,471,959 and 2,520,338; azoamidine compounds such as disclosed in U.S. Pat. 2,599,300; and cyclic amidines such as azobis-N,N'-methylene isobutyramide monoacetate. Suitable additional free radical precursors are listed, for example, in Faraday Society, Symposium on Free Radicals, London, 1953, and Ingram, Free Radicals, Academic Press, Inc., New York, 1958. The dialkyl peroxydicarbonate have been found particularly useful vinyl polymerization initiators, with diisopropyl peroxydicarbonate being presently preferred because of its reactivity. Preparation of a number of peroxydicarbonates is described in U.S. Pat. 2,370,588 and 2,464,012, which are incorporated herein by reference.

A particular feature of the invention is that substantial improvement in pourability is obtained from the use of minor amounts of pourability modified. Generally, from about 0.05 to about 5 weight percent, based on the weight of polymer product, are effective in obtaining resins having good pourability. Preferably, the modifiers are incorporated into the polymerization recipies in an amount of from 0.2 to 2 weight percent, based on the weight of polymer product. Mixtures of the modifiers have also been found to be effective.

An important feature of the invention is the requirement that pourability modifiers must be added to the polymerization recipes before termination of the vapor phase polymerization reaction. Thus, when using a single-stage fluidized bed reaction zone, the modifiers can be added as a separate stream or in admixture with the catalyst stream and/or seed polymer stream to the polymerization reaction zone. In the case of staged liquid bulk polymerization-vapor phase polymerizations, the modifiers are preferably added to the liquid phase reaction zone in which the seed polymer is prepared.

Figure 2:
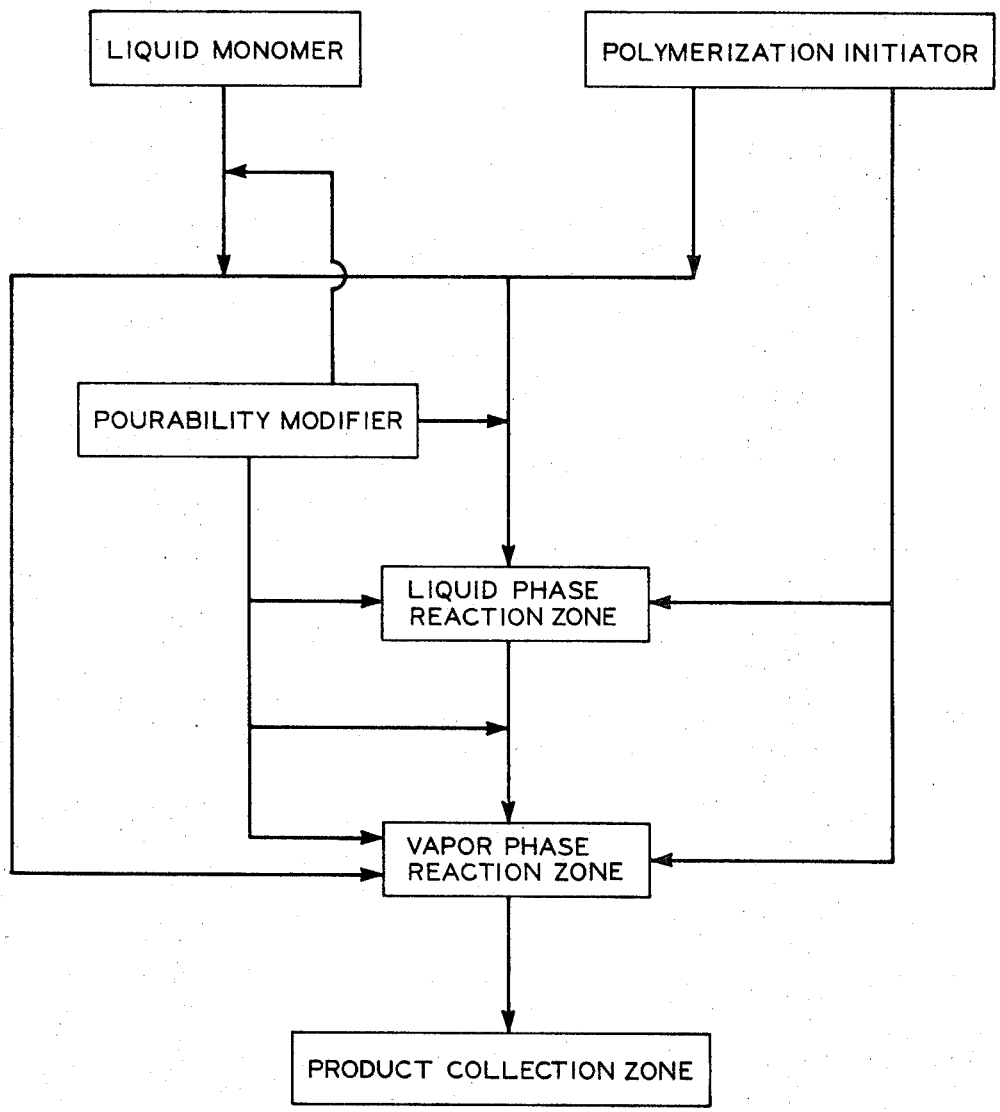

Referring now to the drawings, FIG. 1 is a schematic representation of one embodiment of the invention as applied to the process of application Ser. No. 778,709, filed Nov. 25, 1968. FIG. 2 is a schematic flow sheet of the practice of this invention in a two-stage liquid phase-vapor phase reaction system employing a preliminary liquid phase polymerization reaction zone for the production of seed polymer in a first stage and a fluidized bed vapor phase polymerization reaction zone in a second stage.

In the practice of the invention in a system such as that outlined in FIG. 1, the vinyl compound, e.g., vinyl chloride, is passed from feed conduit 11 through compressor 12 and conduit 13 located in the bottom portion of fluidized bed reactor 15. A portion of the monomer from conduit 11 is passed through conduit 16 and compressor 17 to conduit 18. The pourability modifiers of the invention are passed through conduit 71 to conduit 18. Seed polymer is introduced into conduit 18 by way of conduits 19 and 21. Catalyst is introduced into conduit 18 by way of conduit 22 to impregnate the seed polymer particles. The catalyst impregnated seed polymer particles in admixture with the pourability modifiers are then introduced into the lower portion of reactor 15 at a point above distributor 14. By incorporating the pourability modifiers during the polymerization, a subsequent blending step is eliminated, a more uniform distribution is produced, and improved properties are obtained.

The rate of flow of monomer through conduit 16 is regulated by valve 23 which is manipulated by flow recorder controller 24 responsive to a comparison of the actual flow rate as indicated by flow sensor 25 and the desired flow rate represented by the output of density controller 26 which is applied to the setpoint input of controller 24. A densitometer 27, for example a gamma ray density unit, measures the density of the mixture of seed polymer particles and monomer in conduit 18 downstream of conduit 21 and applies a signal representative of the measurement to the measurement input of controller 26. The setpoint input 28 of controller 26 represents the desired density value. In general, this density will be in the range corresponding to about 5 weight percent polymer particles to about 50 weight percent polymer particles. The desired density will vary with the monomer, the size of the seed polymer particles, the desired transfer rate of seed polymer through conduit 18 and the amount of monomer required to transport the seed polymer particles.

Recycled monomer is introduced by way of conduits 31 and 32 into conduit 11 downstream of valve 33. Valve 33 is manipulated by flow recorder controller 34 responsive to a comparison of the actual flow rate through conduit 13 as indicated by flow sensor 35 and the desired flow rate represented by setpoint input 36. The rate of flow through conduit 13 is sufficient to provide an upward flow of fluidizing gas in reactor 15 in the range of about 0.1 foot per second to about 0.4 foot per second depending upon the desired particle size of the polymer. Where the flow rate of monomer through conduit 16 is sufficient, the output of flow sensors 25 and 35 can be added and the composite signal applied to the measurement input of controller 34. The pressure and temperature in reactor 15 will generally be in the range of about 60 p.s.i.a. to about 175 p.s.i.a. and about 100° F. to about 165° F., respectively.

A gaseous monomer stream, containing entrained polymer fines, is passed by way of conduit 41 from the overhead portion of reactor 15 into cyclone separator 42. Valve 43, located in conduit 41, is manipulated by pressure recorder controller 44 responsive to a comparison of the actual pressure in the overhead of reactor 15 as indicated by pressure sensor 45 and the desired pressure represented by setpoint 46. Solid particles withdrawn from separator 42 can be passed through conduit 47, blower 48 and conduit 21 into conduit 18. Where the solid particles in separator 42 have a size greater than desired, all or a portion can be passed through conduit 49 and a grinder 51 to blower 48. Valves 52 and 53, located in conduits 47 and 49, respectively, can be manipulated to vary the portion of the solids passing through the respective conduits. The gaseous monomer from the overhead of separator 42 is recycled through conduit 31 to feed conduit 11. Heavier polymer particles are withdrawn from the bottom of reactor 15 by way of conduit 54 and star valve 55 and are introduced into flash tank 56 which is operated at a sufficiently low pressure to free unreacted monomer. The gaseous monomer is withdrawn from flash tank 56 and passed by way of conduit 32 to feed conduit 11. The denuded polymer particles pass from the bottom of flash tank 56 through conduit 57 and star valve 58 into screen chamber 61. The screen chamber 61 can be provided with an upper, large mesh screen 62 to retain only the polymer particles having a size greater than the maximum desired particle size while passing all smaller polymer particles. The large size polymer particles are withdrawn by way of overflow conduit 63 and passed into grinder 64 wherein the large particles are ground into small seed polymer particles. The polymer fines, which have a particle size less than the minimum desired product size, pass through a second small mesh screen 65 and are withdrawn from the bottom of screen chamber 61 by way of underflow conduit 66. The polymer particles which have a particle size within the range of the minimum desired product particle size to the maximum desired product particle size are withdrawn from screen chamber 61 by way of intermediate conduit 67 and passed to storage or further processing as desired. The fines from conduit 66 and the effluent of grinder 64 are combined and passed through conduit 19 into the gaseous monomer stream in conduit 18. Where desired a condenser can be utilized in conduit 18 upstream of conduit 19 to liquefy the monomer to provide a slurry of seed polymer particles in liquid monomer. A valve can be positioned in conduit 18 adjacent the outlet thereof into reactor 15 to maintain the upstream pressure in conduit 18 necessary to maintain the liquid slurry. Screen 62 will have a mesh size depending on the desired maximum product particle size and will generally be in the range of 10 mesh to 100 mesh (Tyler), corresponding to a maximum particle size of 0.065 inch to 0.0058 inch. Similarly, screen 65 will be selected in accordance with the minimum desired product particle size and will generally be in the range of 200 mesh to 400 mesh (Tyler) corresponding to a minimum desired product particle size of 0.0029 inch to 0.0015 inch. Where the size of some of the particles passing through conduit 66 are greater than the maximum desired seed polymer particle size, conduit 66 can be connected directly to an inlet of grinder 64 instead of conduit 19. The size of the seed polymer from grinders 51 and 64 will generally be in the range of about 100 to about 400 mesh. If desired a portion of the monomer vapor recycle from separator 42 can be passed through conduit 72 containing condenser 73 and pump 74 for the purpose of aiding in the regulation of the temperature in reactor 15.

In practicing two-stage liquid-vapor phase polymerization processes according to systems such as shown in FIG. 2, liquid polymerizable vinyl monomer, e.g., vinyl chloride, is admixed with polymerization initiator, e.g., diisopropyl peroxydicarbonate. The pourability modifier is preferably added to the liquid phase polymerization reaction system, either in admixture with the monomer and/or initiator stream or as a separate stream and the vinyl compound is polymerized in the presence of the pourability modifiers. The crude reaction mixture resulting from the liquid polymerization and including seed polymer and unreacted monomer, and catalyst, is passed to the vapor phase reaction zone under conditions that result in vaporization of substantially all of the vinyl monomer. It will be appreciated that additional ingredients may be added to the liquid phase reaction mixture entering the vapor phase reaction zone, such as additional monomer, initiator and pourability modifier. The polymer product is recovered from the vapor phase reaction zone and collected for further processing.

The following examples are illustrative of the invention.

EXAMPLE I

A fluidized bed reactor is operated at 140° F. and 115 p.s.i.g. for the vapor phase polymerization of vinyl chloride. The charge rates to the reactor are 400 pounds per hour of finely ground poly(vinyl chloride) seed particles and 3.6 pounds per hour of diisopropyl peroxydicarbonate with vinyl chloride charge and circulation to produce 5000 pounds per hour of poly(vinyl chloride) product. The total vinyl chloride charge rate to the fluidized bed is 123,000 pounds per hour of which 35,000 pounds is supplied to the reactor in the form of liquid to counteract the heat formed during polymerization, 2000 pounds per hour is used to transfer the ground seed to the reactor, and the remainder is recirculated through a cyclone and blower for the purpose of fluidizing the polymer particles. From the cyclone is separated 40 pounds per hour of finely divided poly(vinyl chloride) particles which pass through a 200 mesh sieve. The product from the bottom of the reactor is passed first onto a 60 mesh screen and the particles retained on the 60 mesh screen amounting to about 320 pounds per hour are ground in a micropulverizer until it passes through a 200 mesh screen. The product through the 60 mesh screen is further screened to recover product 200 mesh and finer. The 200 mesh and finer poly(vinyl chloride) from the cyclone, from the grinding of larger particles and from screening the product, are combined and amount to 400 pounds per hour. Vinyl chloride, compressed by a blower in the amount of about 2000 pounds per hour, is used to transfer the ground poly(vinyl chloride) to the reactor. Before entering the reactor it is sprayed in the line with 3.6 pounds per hour of diisopropyl peroxydicarbonate as a 10 percent by weight solution in n-pentane. The initiator solution is maintained at 0° F. to protect it from decomposition prior to use. In addition, 50 pounds per hour of dibutyltin dilaurate which is diluted 50:50 with n-pentane is sprayed onto the ground poly(vinyl chloride) before it enters the reactor. The screened product, having a particle size range of 60 to 200 mesh, is further swept countercurrently with nitrogen at 160° F. to remove vinyl chloride vapor and pentane. The product amounting to 5000 pounds per hour and containing about one percent by weight dibutyltin dilaurate is stored for bagging and for further processing into blends.

While particle size separator 61 has been illustrated in terms of sizing screens, any other means for separating according to particle size can be utilized.

EXAMPLE II

A series of runs is made to demonstrate the improvements in processing characteristics of poly(vinyl chloride) produced in accordance with the invention (Runs 5–16). Runs 1–4 are vapor phase polymerizations not in accordance with the invention but included for purposes of comparison. In each run, the additive is sprayed upon 100 g. of poly(vinyl chloride) seed polymer prior to introduction into a vapor phase polymerization reactor. The polymerization of vinyl chloride monomer is effected in the vapor phase at 140° F. and 115 p.s.i.g., using 0.07 g. diisopropyl peroxydicarbonate as polymerization initiator, with a residence time of 1½ hours. The results of these runs are reported in Table I.

TABLE I.—PROCESSABILITY OF VAPOR PHASE PVC

| Run | Additive | Additive, g. | Productivity, g./g. initiator | Bulk density, g./cc. | Pourability,[a] sec |
|---|---|---|---|---|---|
| 1 | None | 0 | 1,698 | | ∞ |
| 2 | Cyclohexane | 5.1 | 1,555 | .490 | ∞ |
| 3 | Toluene | 4.3 | 1,115 | .491 | ∞ |
| 4 | Freon-12 | 5.4 | 763 | .420 | ∞ |
| 5 | DBTDL [b] [c] | 1.0 | 1,560 | .645 | 16.4 |
| 6 | DBTDL [c] | 2.0 | 1,720 | .675 | 16.7 |
| 7 | Calcium stearate [c] | 1.0 | 1,835 | .684 | 16.2 |
| 8 | Calcium stearate [c] | 2.0 | 1,410 | .685 | 15.7 |
| 9 | Zinc stearate | 1.0 | 1,285 | .649 | 18.5 |
| 10 | Strontium naphthenate [c] | 1.0 | 1,076 | .584 | 17.7 |
| 11 | Advance BC-72[c] [d] | 2.0 | 701 | .643 | 20.3 |
| 12 | Water [e] | 10 | 1,990 | .586 | 21.5 |
| 13 | Gelatin [e] | 0.5 | 1,045 | .599 | 17.8 |
| 14 | Tensaktol A [c] [f] | 0.5 | 1,360 | .603 | 18.4 |
| 15 | Bis(β-chloroethyl) vinyl phosphonate | ~5 | 1,740 | .589 | 20.3 |
| 16 | Aerosol OT [c] [g] | 0.5 | 1,405 | .594 | 16.8 |

[a] Determined according to ASTM D-1895.
[b] Dibutyltin dilaurate.
[c] Added with 5.1 g. cyclohexane.
[d] Barium-cadmium-zinc mixed soaps.
[e] Added with 5 g. water.
[f] Sodium salts of di-$C_9$ to $C_{14}$-alkyl sulfonimides.
[g] Sodium salt of bis(2-ethylhexyl) sulfosuccinate.

Thus, whereas the poly(vinyl chloride) produced in Runs 1–4 would not pour under the conditions of the pourability test procedure, the poly(vinyl chloride) produced in Runs 5–16 in accordance with the invention did pour when subjected to the same test.

Reasonable variations and modifications are possible within the foregoing disclosure, the drawings and the appended claims to the invention.

We claim:

1. A process for preparing vinyl polymers which comprises subjecting to vapor phase polymerization conditions from 75 to 100 weight percent of vinyl chloride and from 0 to 25 weight percent of at least one other vinyl monomer copolymerizable with vinyl chloride under vapor phase polymerization conditions, in a substantially solvent-free or diluent-free environment, with a free radical polymerization initiator and in the presence of from about 0.05 to about 5 weight percent, based on weight of polymer product, of at least one compound selected from the class consisting of mono-, di-, and trialkyltin salts of saturated carboxylic acids having from 2 to 20 carbon atoms, and wherein each alkyl group contains from 1 to 12 carbon atoms; alkali metal salts of di-$C_9$ to $C_{14}$-alkyl sulfonimides; Groups I-A, II-A, II-B and IV-A metal salts of saturated carboxylic acids having from 6 to 22 carbon atoms; water; gelatin; bis(β-chloroethyl) vinyl phosphonate or the alkali metal salts of bis(2-ethylhexyl) sulfosuccinate, said compound being present before said polymerization is terminated; and recovering the thus-formed polymer.

2. The process of claim 1 wherein the amount of said compound is in the range of 0.2 to 2 weight percent, based on weight of polymer product.

3. The process of claim 1 wherein said compound is selected from the group consisting of the mono-, di-, and trialkyltin salts of saturated carboxylic acids having from 2 to 20 carbon atoms and said alkyl groups contain from 1 to 12 carbon atoms.

4. A process for preparing vinyl polymers comprising the steps of polymerizing under liquid phase polymerization conditions in a substantially solvent-free or diluent-free environment the following ingredients:
  (A) from 75 to 100 weight percent of liquid vinyl chloride;
  (B) from 0 to 25 weight percent of a liquid vinyl compound copolymerizable with vinyl chloride under polymerization conditions;
  (C) from 0.05 to about 5 weight percent, based on weight of polymer product, of at least one pourability modifier selected from the class consisting of mono-, di-, and trialkyltin salts of saturated carboxylic acids having from 2 to 20 carbon atoms, and wherein each alkyl group contains from 1 to 12 carbon atoms; alkali metal salts of di-$C_9$ to $C_{14}$-alkyl sulfonimides; Groups I-A, II-A, II-B and IV-A metal salts of saturated carboxylic acids having from 6 to 22 carbon atoms; alkali metal salts of bis(2-ethylhexyl) sulfosuccinate; water; gelatin; or bis(β-chloroethyl) vinyl phosphonate; and
  (D) a vinyl polymerization initiator; and subjecting the thus-formed reaction mixture comprising vinyl polymer and unreacted liquid monomer to vapor phase polymerization conditions in a substantially solvent-free of diluent-free environment; and recovering the thus-formed polymer.

5. The process according to claim 4 wherein said pourability modifier is selected from the class consisting of mono-, di-, or trialkyltin salts of saturated carboxylic acids containing from 2 to 20 carbon atoms and wherein said alkyl group contains from 1 to 12 carbon atoms.

6. The process according to claim 4 wherein said pourability modifier is present in an amount of 0.2 to 2 weight percent, based on weight of polymer product.

7. The process according to claim 5 wherein said pourability modifier is present in an amount of 0.2 to 2 weight percent, based on weight of polymer product.

8. The process according to claim 7 wherein said pourability modifier is dibutyltin dilaurate.

9. The process of claim 4 comprising the step of polymerizing said reaction mixture containing polymer and unreacted monomer under vapor phase conditions in a substantially solvent-free or diluent-free environment and in the presence of added monomer comprising from 75 to 100 weight percent vinyl chloride and from 0 to 25 weight percent of a vinyl compound copolymerizable with vinyl chloride under reaction conditions, and recovering the thus-formed polymer.

References Cited

UNITED STATES PATENTS

| 2,715,117 | 8/1955 | Baeyaert | 260—92.8 |
| 2,961,432 | 11/1960 | Fikentscher et al. | 260—87.1 |
| 3,373,150 | 3/1968 | Pears et al. | 260—92.8 |

JOSEPH L. SCHOFER, Primary Examiner

J. KIGHT III, Assistant Examiner

U.S. Cl. X.R.

260—87.1, 87.5, 92.8